(12) United States Patent
Eckstrom (10) Patent No.: US 10,149,483 B2
(45) Date of Patent: Dec. 11, 2018

(54) READY-TO-BAKE BATTER AND METHODS OF MAKING THE SAME

(75) Inventor: Eleanore Brophy Eckstrom, Chicago, IL (US)

(73) Assignee: Kraft Foods Group Brands LLC, Northfield, IL (US)

( * ) Notice: Subject to any disclaimer, the term of this patent is extended or adjusted under 35 U.S.C. 154(b) by 509 days.

(21) Appl. No.: 13/561,688

(22) Filed: Jul. 30, 2012

(65) Prior Publication Data

US 2013/0034642 A1 Feb. 7, 2013

Related U.S. Application Data

(60) Provisional application No. 61/515,483, filed on Aug. 5, 2011.

(51) Int. Cl.
*A21D 10/00* (2006.01)
*A21D 10/04* (2006.01)
*A23C 19/09* (2006.01)

(52) U.S. Cl.
CPC ............. *A21D 10/00* (2013.01); *A21D 10/04* (2013.01); *A21D 10/045* (2013.01); *A23C 19/0912* (2013.01)

(58) Field of Classification Search
CPC ..................................................... A21D 10/04
USPC ................................................. 426/392, 474
See application file for complete search history.

(56) References Cited

U.S. PATENT DOCUMENTS

| | | | |
|---|---|---|---|
| 2,982,662 A | 5/1961 | Cochran et al. |
| 3,808,341 A | 4/1974 | Rongey et al. |
| 3,970,763 A | 7/1976 | Moran et al. |
| 4,312,891 A | 1/1982 | Eisfeldt |
| 4,350,713 A | 9/1982 | Dyson et al. |
| 4,594,255 A | 6/1986 | Wilson et al. |
| 4,732,772 A | 3/1988 | Nolte |
| 5,384,139 A | 1/1995 | Vasseneix |
| 6,039,994 A | 3/2000 | LeFlecher et al. |
| 6,106,884 A | 8/2000 | Rapaport |
| 6,165,524 A | 12/2000 | Narayanaswamy et al. |
| 6,224,924 B1 | 5/2001 | Narayanaswamy et al. |

(Continued)

FOREIGN PATENT DOCUMENTS

EP 0 216 437 A2 4/1987
WO 02/096210 A1 12/2002

OTHER PUBLICATIONS

Intellectual Property Office of New Zealand Examination Report dated Aug. 6, 2012 for New Zealand Patent Application No. 601553, 2 pages.

(Continued)

*Primary Examiner* — Erik Kashnikow
*Assistant Examiner* — Lela S. Williams
(74) *Attorney, Agent, or Firm* — Fitch, Even, Tabin & Flannery, LLP (57) ABSTRACT

A ready-to-bake batter and method for manufacture are provided. The method includes the steps of: combining cream cheese, cream, sweetener, and eggs to form a mixture; heating the mixture to at least 140° F. to create a heated mixture; injecting an inert gas into the heated mixture; aerating the heated mixture; and cooling the heated mixture to form a batter. The batter is stable when stored for over 120 days such that when baked, the batter provides a cake similar to a fresh made-from-scratch cake.

22 Claims, 3 Drawing Sheets

(56) References Cited

U.S. PATENT DOCUMENTS

| | | | |
|---|---|---|---|
| 6,224,925 B1 | 5/2001 | Narayanaswamy et al. | |
| 6,228,403 B1 | 5/2001 | Narayanaswamy et al. | |
| 6,265,524 B1 | 7/2001 | Takemoto et al. | |
| 6,863,909 B2 * | 3/2005 | Baensch et al. | 426/61 |
| 7,897,185 B1 | 3/2011 | Gutknecht et al. | |
| 2001/0002267 A1 * | 5/2001 | Rapaport | 426/94 |
| 2004/0247758 A1 * | 12/2004 | Hine et al. | 426/491 |
| 2006/0251772 A1 | 11/2006 | O'Conner et al. | |
| 2007/0042099 A1 | 2/2007 | Stanton | |
| 2007/0071862 A1 | 3/2007 | Mitchell et al. | |
| 2007/0286933 A1 | 12/2007 | O'Connor et al. | |
| 2009/0074923 A1 | 3/2009 | Beaulieu | |
| 2009/0155433 A1 | 6/2009 | Steinbekken | |
| 2010/0112147 A1 * | 5/2010 | Barnard | A23C 9/1544 426/130 |

OTHER PUBLICATIONS

J. N. deWit and G. Klarenbeek, "Effects of Various Heat Treatments on Structure and Solubility of Whey Proteins," Journal of Dairy Science, 1984, vol. 67, No. 11, pp. 2701-2710.

Owen R. Fennema, Food Chemistry, Second Edition, Revised and Expanded, Marcel Dekker, Inc., New York and Basel, 1985, "Section C. Heat Coagulability of Albumen, Yolk, and Egg Magma," pp. 850-855.

Ruth E. Baldwin, Egg Science & Technology, 3rd Edition, AVI Publishing Co., 1986, "16. Functional Properties of Eggs in Foods," pp. 345-383.

\* cited by examiner

Fig. 1

Fig. 2A Whipped Hot

Fig. 2B Whipped Cold

Fig. 2C Whipped Cream Cheese

Fig. 2D Hot Processed-No Whipping

Fig. 3A Whipped Hot

Fig. 3B Whipped Cold

Fig. 3C Whipped Cream Cheese

Fig. 3D Hot Processed-No Whipping

READY-TO-BAKE BATTER AND METHODS OF MAKING THE SAME

CROSS-REFERENCE TO RELATED APPLICATION

This application claims benefit of U.S. Provisional Application No. 61/515,483, filed Aug. 5, 2011, which is hereby incorporated herein by reference in its entirety.

FIELD

The present application is directed to a ready-to-bake dessert product and its method of manufacture. More particularly, the present application relates to a cheesecake batter which can be stored for extended periods of time at refrigerated temperatures and then may be directly poured and baked to produce a high-quality cheesecake dessert.

BACKGROUND

Making a cheesecake from scratch using ingredients including a soft uncured cheese (such as cream cheese), butter, eggs, and sugar provides a quality dessert having premium flavor and texture. Preparing such a cheesecake, however, requires significant time and effort that many consumers today are unwilling or unable to expend. Various ready-to-use-type cheesecake products are known which are intended to allow the consumer to prepare a cheesecake in less time and with less effort. These products, however, sacrifice a certain degree of quality to convenience. To compensate for the decline in quality, it may be necessary for the consumer to add staple ingredients, such as cream cheese, in order to provide a cheesecake of a quality more closely resembling a from-scratch cheesecake.

Dry mixes may also offer certain time-saving advantages. Often, the mixes are made so that the consumer only adds water to the mix and bakes. These mixes can be stored at ambient temperature for extended periods of time. However, these mixes alone do not provide the quality of fresh ingredients. In fact, in some cases, the consumer may be required to add certain ingredients to improve the quality. However, having the consumer add ingredients detracts from the time-saving advantages of using a prepared mix, as well as increases the effort required by the consumer.

Cheesecake mixes are also known that can be used to prepare a cold-set cheesecake, thereby eliminating baking. U.S. Pat. No. 4,312,891, issued to Eisfeldt, is directed to a shelf-stable fluid product that gels upon setting at refrigerated temperatures. The product contains gelatin, starch, sweetening agent, and a protein source, which are believed to interact during preparation of the product to provide a reversible gel matrix. The consumer whips the product to incorporate air into the product and then refrigerates the product, allowing it to gel and form a cheesecake.

U.S. Pat. No. 4,594,255, issued to Wilson, is directed to a dry mix which can be used to prepare a sugar-free cheesecake. Milk is added to the mix, and the rehydrated mix then is whipped to mix the ingredients, as well as to incorporate air into the filling, which will affect the lightness of the texture of the final product. The mix is then poured into a prepared crust and chilled for several hours to allow the mix to gel and form a cheesecake.

These cold-set mixes also sacrifice a degree of quality because of the constitution of the ingredients and the method of preparation. Cold-set cheesecakes generally cannot offer the texture and mouthfeel of a baked-from-scratch cheesecake because of the addition of a gel component in the mix. Furthermore, although the cold-set method may be easier than baking, the benefits to texture and appearance from baking are lost.

Cheesecake products are known which can be used to prepare an improved-quality cheesecake when the consumer bakes the dessert rather than having it gel in the refrigerator. These products still save time because a complete (or nearly complete) mix is provided. One such ready-to-bake mix is disclosed in U.S. Pat. No. 4,732,772 to Nolte which discloses a ready-to-use cheesecake filling mix which, upon whipping and baking, produces a quality cheesecake filling. The filling mix contains, among other ingredients, cream, sugar, eggs, milk, and nonfat dry milk. Such a mix is storable for an extended period of time at refrigerator or freezer temperatures. The consumer aerates the filling mix by whipping and then bakes. Preparing a cheesecake from a mix of this type still requires effort and time on the part of the consumer. Moreover, failure to fully aerate the filling mix can result in a less desirable product.

Moreover, many of the prior cheesecake batters sacrifice flavor and texture for shelf life and stability. For example, ingredients having a longer shelf life are substituted for ingredients that traditionally may be used in made-from-scratch recipes. Conversely, ingredients used in traditional made-from-scratch recipes generally do not have as long of a shelf life and stability. In this regard, it may be desirable to have a cheesecake batter that has the taste and texture of a traditional made-from-scratch recipe with increased shelf life and stability. For example, it may be desirable to have a cheesecake batter that has a shelf life of at least 120 days.

SUMMARY

In one form, a ready-to-bake cheesecake batter and a method for producing such a batter is provided. In this regard, the batter may be used to bake a real, "authentic" full fat made from scratch cheesecake taste.

According to one form, the batter contains ingredients such as cream cheese, cream and eggs, and can be stored for an extended period in the refrigerator. For example, the batter may be stable for at least 120 days when refrigerated.

In accordance with one form, no additional ingredients need be added to the batter in order to prepare a cheesecake. Using this batter, a consumer can bake a cheesecake which has the quality and flavor of a baked-from-scratch cheesecake in an easy, time-saving manner.

The batter can be stored at refrigerated temperatures until used, at which time the consumer simply pours the batter into a prepared crust and bakes in the oven. Adding ingredients, mixing, and/or whipping are not required. The batter can be made in a variety of flavors and in a low-fat version.

In one form, a method for preparing a ready-to-bake batter is provided. The method includes the steps of combining cream cheese, cream, sweetener, and eggs to form a mixture; heating the mixture to at least 140° F. to create a heated mixture; injecting an inert gas into the heated mixture; aerating the heated mixture; and cooling the heated mixture to form a batter.

A ready-to-bake batter and method for manufacture are provided. The method includes the steps of: combining cream cheese, cream, sweetener, and eggs to form a mixture; heating the mixture to at least 140° F. to create a heated mixture; and aerating and cooling the heated mixture concurrently to form a batter. Further, the temperature of the heated mixture at the beginning of the aerating and cooling step is at least 140° F.

A ready-to-bake batter and method for manufacture are provided. The method includes the steps of: combining cream cheese, cream, sweetener, and eggs to form a mixture; heating the mixture to at least 140° F. to create a heated mixture; and aerating and cooling the heated mixture in a scraped surface heat exchanger to form a batter. Further, the heated mixture is maintained above 140° F. for less than 20 minutes to minimize cooking of the eggs and the temperature of the heated mixture at the beginning of the aerating and cooling step is at least 140° F.

According to one form, the aerating and cooling steps are performed concurrently.

In accordance with one form, the aerating and cooling steps are performed in a scraped surface heat exchanger.

In one form, the cream cheese and cream are each preheated prior to combining with the eggs.

According to one form, the method further includes the step of cool filling the batter in one or more containers at a temperature below 60° F. prior to storage.

In accordance with one form, the sweetener is sugar.

In one form, the batter is stable for over 120 days when stored at a temperature at or below about 55° F.

According to one form, the inert gas is nitrogen and is injected when the heated mixture is at least 140° F.

In one form, the batter is stable when stored for over 120 days such that when baked, the batter provides a cake similar to a fresh made-from-scratch cake.

DETAILED DESCRIPTION

The present application relates to a ready-to-bake cheesecake batter and a method for producing such a batter. In one form, the batter contains fresh, high quality ingredients, such as cream cheese, cream and eggs, and can be stored for an extended period in the refrigerator. In one form, no additional ingredients need be added to the batter in order to prepare a cheesecake. The batter may be processed using a hot whipping procedure whereby the combined ingredients are cooked and then whipped hot to aerate while cooling. It is hypothesized that the hot whipping helps enrobe inert gas cells with fat and/or protein to help stabilize the cells and thereby improve shelf life.

Using this batter, a consumer can bake a cheesecake which has the quality and flavor of a baked-from-scratch cheesecake in an easy, time-saving manner. Numerous flavor varieties of the cheesecake are possible. By "baked-from-scratch cheesecake" it is meant a cheesecake prepared in a conventional manner of combining fresh ingredients such as eggs, cream, and sugar, whipping the ingredients together to mix and aerate the batter, pouring the batter into a crust, and baking in an oven.

In one form, the cheesecake batter generally contains cream cheese, sweetener, cream, eggs and other optional ingredients such as stabilizers and flavoring agents. This product uses standard cream cheese as a base and egg ingredients to have the preferred texture and flavor after baking.

The cream cheese may be a full fat cream cheese or a reduced fat cream cheese. Using cream cheese and cream in the batter may provide a premium quality cheesecake. It should be noted that a variety of different forms of cream cheese may be used including, but not limited to, full fat cream cheese, reduced fat cream cheese, Neufchatel cheese and the like. These ingredients may provide the quality of a made-from-scratch cheesecake in a ready-to-use batter, so that the consumer need not purchase the cream cheese separately. Generally, the cheeses and cream provide the desired flavors, texture, and viscosity.

The sweetener may be sugar or other natural or processed sweeteners. The eggs may be pasteurized eggs, egg replacements, starches and the like. The preservatives may include calcium propionate, potassium sorbate, sorbic acid, phosphoric acid, and the like. Suitable emulsifiers include mono and diglycerides and the like. The flavoring agents may include any number of different flavoring and texturizing agents such as fruit flavoring, chocolate flavoring, cookie flavoring and the like.

It should be understood that other ingredients may also be included in the batter before, during and/or after processing. For example, the batter may also include flour, cornstarch, cream, sour cream, as well as other ingredients.

A standard New York style cheesecake includes 60-63% cream cheese, 12-15% sugar, 1.0-1.5% flour, 0.2-0.8% vanilla extract, 5-13 sour cream or heavy cream and 10-18% eggs. In one form, the ingredients in the batter include all the ingredients used to make a standard New York style cheesecake, with the exception of flour.

In one form, the cheesecake batter includes components in the ranges as listed below in Table 1. However, it should be understood that other ingredient ranges and also ingredients may also be utilized.

TABLE 1

| Ingredient ranges | |
|---|---|
| Ingredient | Range |
| Cream Cheese | 60-68% |
| Cream | 5-10% |
| Sugar | 10-15% |
| *Vanilla* Extract | 0.05-0.15% |
| Liquid Whole Eggs | 10-15% |
| Sugared Egg Yolks | 1-5% |
| Sorbic Acid | 0.05-0.1% |

One form of a process to manufacture batter will be described with reference to FIG. 1. Generally this process involves mixing and homogenizing with a cooking step to combat microorganisms and mold to improve shelf life. As will be described below in more detail, the ingredients may be added in a variety of combinations and orders and may also include pre-heated ingredients.

In one form, the cream cheese, sugar and cream are added first to reduce lumps of cream cheese and to dissolve the sugar. Afterwards, the eggs, vanilla and ascorbic acid may be added. It should be understood that ingredients may also be added in different orders. Additionally, in one form, the cream cheese and cream are preheated. According to one form, the cream cheese and cream may be preheated to 160-165° F.

Figure 1:
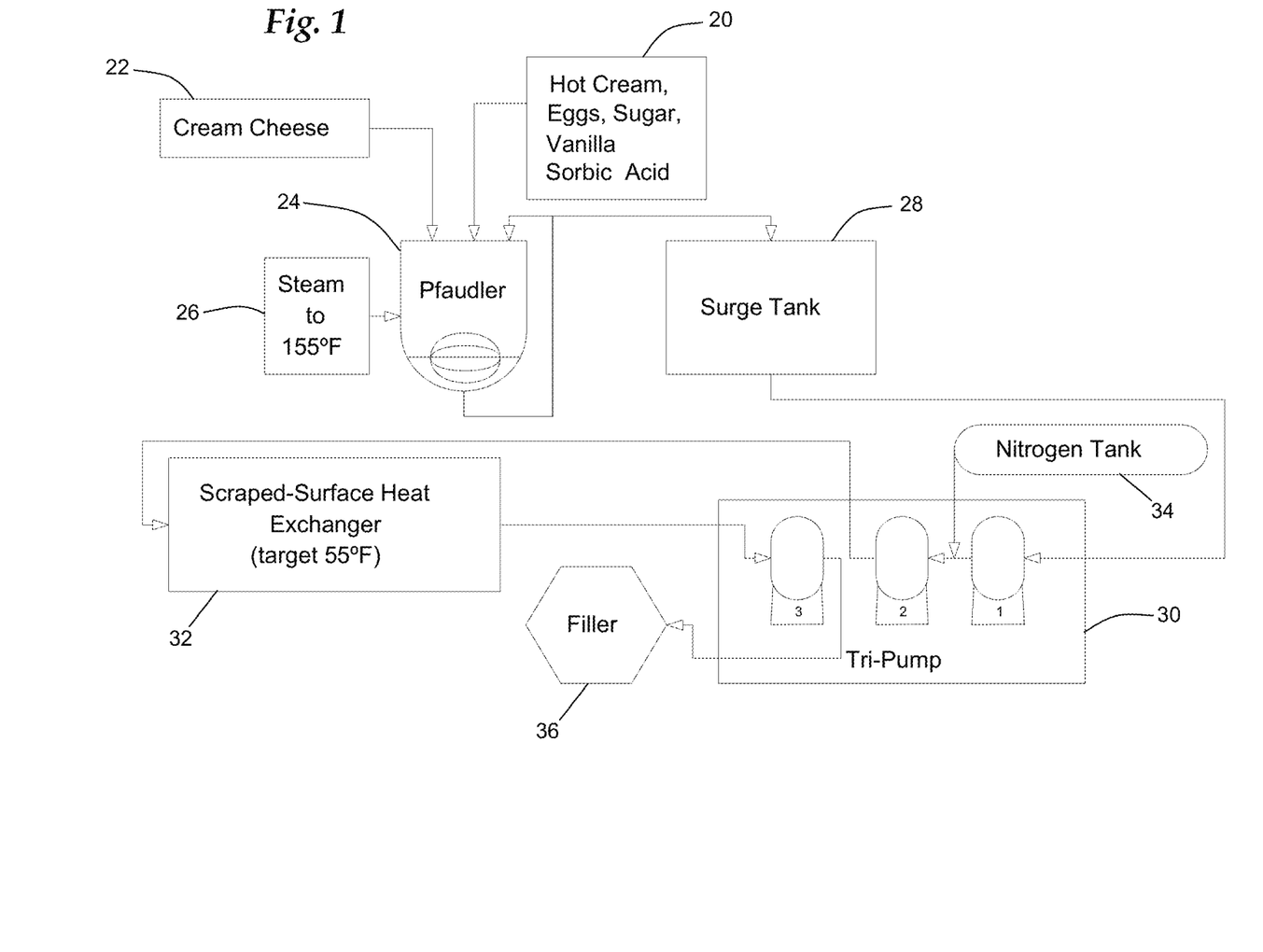
FIG. 1 is a process flow diagram illustrating one process for manufacturing ready-to-bake cheesecake batter.

As shown in FIG. 1, an input 20 containing hot cream, eggs, sugar, vanilla and sorbic acid are combined with an input 22 containing cream cheese. The inputs 20,22 are combined in a blender or mixer 24, such as a Pfaudler mixer. Generally, the ingredients may be mixed for 1-2 minutes with recirculation. The combined ingredients are then heated for about 1-5 minutes to a temperature range of about 145° F. to about 155° F. and held for about 1-5 minutes. In one form, steam may be used, as shown at reference number 26. In this regard, the steam may be used to quickly heat the combined ingredients while attempting to minimize cooking of the egg component in the combined ingredients. According to one form, the eggs should be maintained above 140° F. for less than 20 minutes. In another form, the eggs should be maintained above 140° F. for less than 10 minutes. In one form, the steam may be at a pressure of 40 p.s.i.g. at a saturated temperature of 331° F. However, it should be understood that other temperatures and pressures may also be used.

The heated, combined ingredients may then be optionally transferred to a surge tank 28 or directly transferred, such as via one or more pumps 30 to a scraped surface heat exchanger 32. Additionally, an inert gas, such as nitrogen may be added from a tank 34 to the heated, combined ingredients. In one form, the inert gas is added when the heated combined ingredients are at a temperature of above about 145° F. While shown as being added at the pump 30, the inert gas may also be added elsewhere during the process prior to cooling and packaging. Further, the inert gas may also or alternatively include other gases such as carbon dioxide, nitrous oxide and the like.

The scraped surface heat exchanger 32 may be used to further aerate and also cool the heated combined ingredients to create a cheesecake batter. In this regard, the heated, combined ingredients are aerated and cooled such that air cells are formed. It is hypothesized that as the batter cools, the air cells are generally lined with a layer of protein and/or fat on the air cell surfaces to help stabilize the air cells. In one form, the batter enters the scraped surface heat exchanger 32 at a temperature of about 145° F. to about 155° F. and exits at a lower temperature, such as about 45° F. to about 65° F.

Generally, hot whipped refers to ingredients that are whipped and/or aerated at around 150° F. while cold whipping generally refers to ingredients that are whipped and/or aerated below about 50° F. Further, cold whipping may involve injecting the inert gas after the batter has been cooled. Other units may also be used besides a scraped surface heat exchanger. In one form, the unit(s) should be suitable to cool and/or provide shearing to whip the ingredients.

The batter is then passed on to a filler 36 where the batter may be placed in containers. It should be noted that the batter should be packaged into containers at a temperature range of about 45° F. to about 60° F. It was found that if the batter is not chilled prior to packaging, such as in the scraped surface heat exchanger 32, that the egg component may continue to cook which may result in an undesirable cheesecake when the batter is baked. For example, if the batter is permitted to stay above 140° F. for 1-3 days, the eggs may coagulate and result in poor performance of the batter.

Figure 2A:
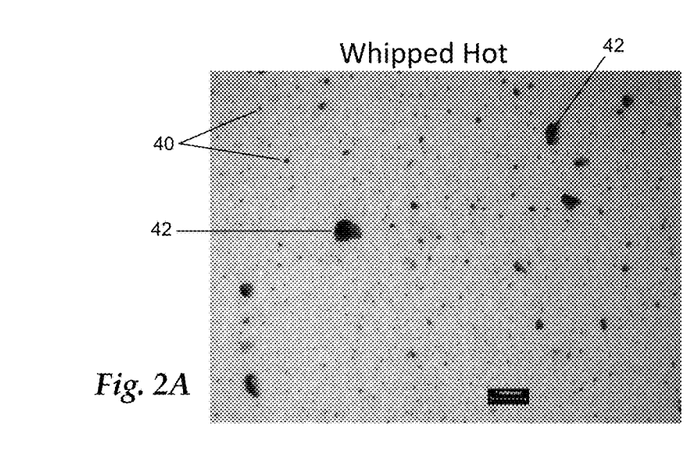
FIG. 2A is a light microscopy of a cheesecake batter that has been whipped while hot.
Figure 2B:
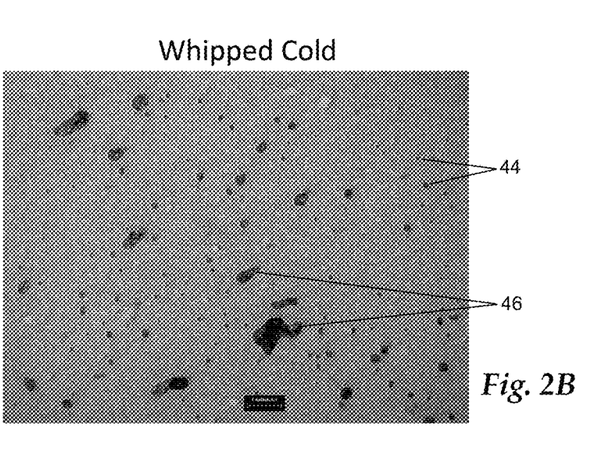
FIG. 2B is a light scanning microscopy of a cheesecake batter that has been whipped while cold.
Figure 2C:
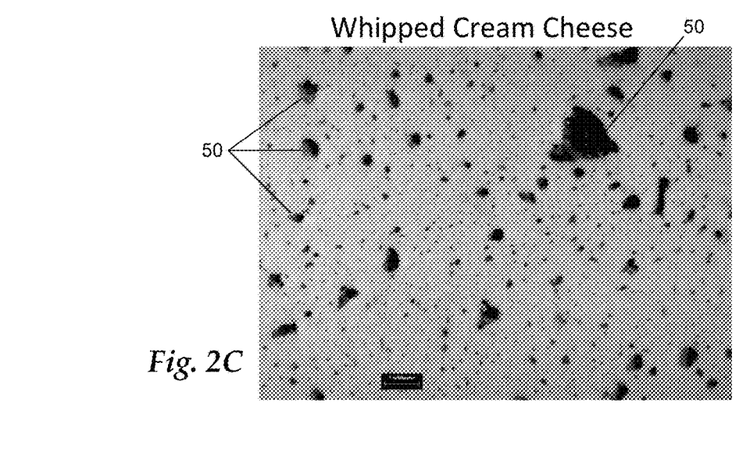
FIG. 2C is a light scanning microscopy of a cream cheese that has been whipped.
Figure 2D:
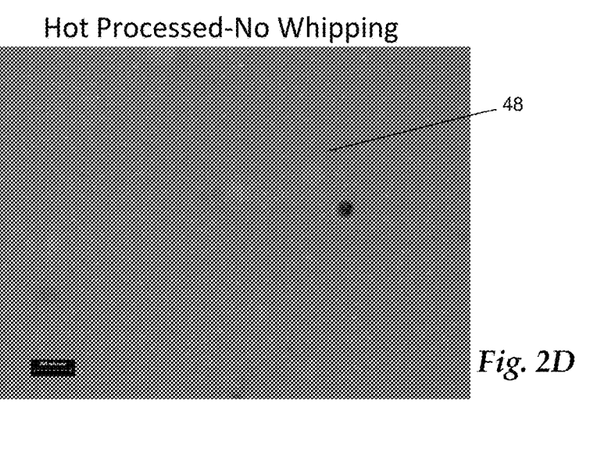
FIG. 2D is a light scanning microscopy of a cheesecake batter that has been hot processed without whipping.

FIGS. 2A-2D are light microscopy images of various forms of cheesecake batter and also a cream cheese. Referring to FIG. 2A, an image of a batter that has been whipped while hot, such as found in the process of FIG. 1 is shown. In this image, the batter includes air cells 40 that are small evenly dispersed droplets with a small amount of coalescence of the air cells 42. This generally illustrates a stable network or protein gel with embedded fat. FIG. 2B shows a similar batter that was first cooled to approximately 50° F. prior to whipping. As compared to FIG. 2A, the batter in FIG. 2B generally includes smaller cells 44 with a greater number of large coalesced cells 46. FIG. 2D illustrates a batter which was heated, but did not include any whipping. In this sample it can be seen that there are significantly fewer air cells 48. FIG. 2C illustrates cream cheese that was whipped and aerated. As can be seen in FIG. 2C, there are a significant number of irregular cells 50 of various sizes.

Figure 3A:
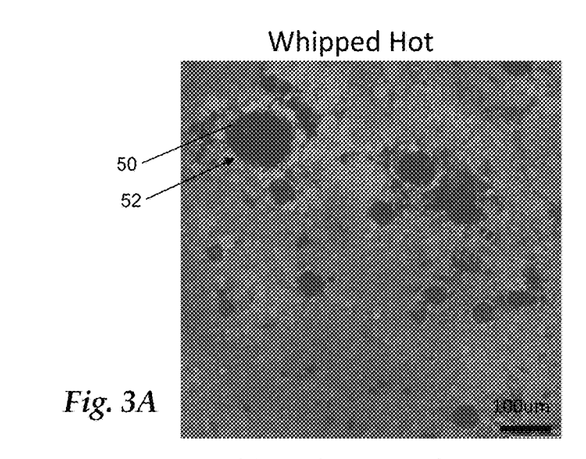
FIG. 3A is a confocal laser scanning microscopy of a cheesecake batter that has been whipped while hot.
Figure 3B:
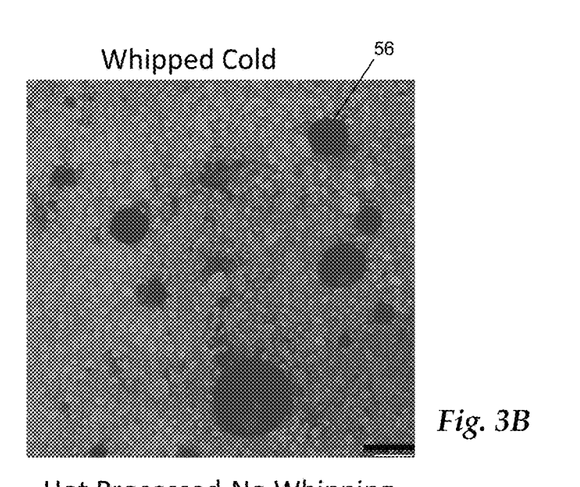
FIG. 3B is a confocal laser scanning microscopy of a cheesecake batter that has been whipped while cold.
Figure 3C:
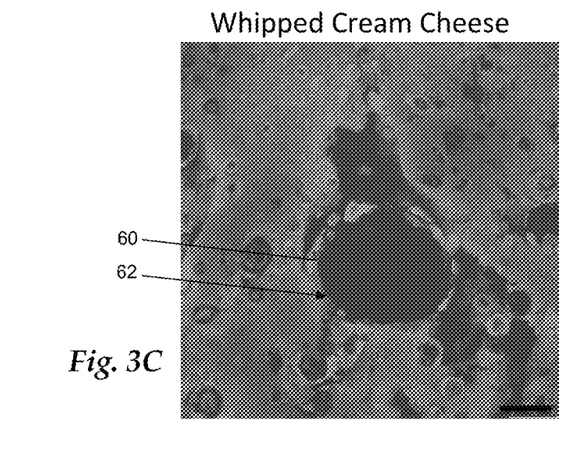
FIG. 3C is a confocal laser scanning microscopy of a cream cheese that has been whipped.
Figure 3D:
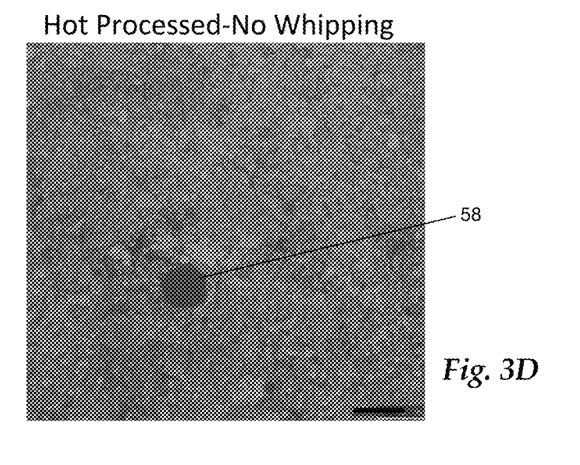
FIG. 3D is a confocal laser scanning microscopy of a cheesecake batter that has been hot processed without whipping.

FIGS. 3A-3D are confocal laser scanning microscopy images of various forms of cheesecake batter and also a cream cheese and generally correspond with the batters and cheesecake found in FIGS. 2A-2D. As seen in FIG. 3A, a layer of fat and protein 52 is found on the air surface to stabilize the air cells 54. FIG. 3B, on the other hand, does not include any significant layering of fat and/or protein at the air cell 56 surfaces, but may include some particles. Similarly, the batter shown in FIG. 3D, which was hot processed, but not whipped, does not include any significant layering of fat and/or protein at the air cell 58 surfaces and includes few air cells whatsoever. The whipped cream cheese shown in FIB. 3C does include some protein and fat 60 at the surface of the air cells 62, but not quite to the level of layering found in the batter of FIG. 3A. Therefore, it is hypothesized that whipping of a hot mixture, such as in a scraped surface heat exchanger may provide a unique combination of protein and/or fat at the surface of the air cells to help stabilize the air cells. In some approaches, the air cells may be from about 1 to about 100 microns in size and have a layer of fat and/or protein surrounding substantially the entire air cell, and in some cases, the entire air cell. The layer of fat and protein may be about 1 to about 10 microns thick.

In one form, the consumer does not need to mix, add additional ingredients to, or otherwise prepare the batter before baking. Whipping in order to aerate the batter, however, sometimes may be desirable, although not required. Thus, whipping may produce an especially light and airy texture that some consumers may find desirable. Such whipping can be carried out, for example, using a wisp or a conventional home kitchen-type mixer. Additionally, the consumer may choose to add other ingredients to customize the flavor of the cheesecake. Such additional ingredients only enhance the flavoring already provided in the batter; they are not required in order to prepare a quality cheesecake from the batter of the invention. Of course, if desired, such flavor components could be added to the batter during manufacture.

In general, the consumer only has to open the container in which the batter is stored, pour or otherwise place the batter into a prepared crust, and then bake. The batter is readily pourable from the container and is easily spreadable in the crust. Generally the batter is a light yellow to cream color, although, if desired, other colorants can be included. When baked, the cheesecake is similar to a baked-from-scratch cheesecake. It has a light yellow interior with a lightly browned surface with a distinct cream cheese flavor, slightly sweetened, and a smooth mouthfeel. Using only a conventional home kitchen-type mixer, the resulting cheesecake is fluffy with a specific gravity of about 0.9. Further, the batter has a water activity of approximately 0.978 at 25.7° F. and a density of about 0.88-0.90 g/cc.

In some approaches, after cooking, the mixture can include hot whipping with an amount of nitrogen may be added thereto to form a cheese cake batter with an overrun of about 10-25%.

The batter is normally stored at refrigerated temperatures. An acceptable storage temperature is in the range of about 35° F. to about 45° F. When stored at these temperatures, the batter generally has a four to six month shelf life.

EXAMPLES

A number of exemplary processes and compositions were prepared to analyze a number of compositional and processing variables. For example, the types of ingredients as well as order of addition of ingredients were varied to compare the resulting batters. Further, different processing techniques and overruns were varied to compare the resulting batters.

Example 1

In Example 1, Sample A was prepared with the following formula:

| Description | % of Total Formula | Pounds/Batch |
| --- | --- | --- |
| Cream Cheese (F201A13) | 64.88% | 77.86 |
| Sugar | 14.00% | 16.80 |
| Vanilla extract | 0.09% | 0.11 |
| Heavy cream | 6.76% | 8.11 |
| Whole Eggs (Liquid, Past.) | 12.18% | 14.62 |
| Sugared Egg Yolks | 2.03% | 2.44 |
| Sorbic Acid | 0.06% | 0.07 |
| Total | 100.00% | 120 |

Sample A was prepared by heating cream cheese to 160-165° F. The mixture was collected and transferred to a Pfaudler kettle with heating and steam injection. The mixture was maintained in the Pfaudler kettle with agitation and recirculation. The mixture was allowed to reach 160° F. at which point eggs were added and then heated to 150° F. and held for approximately 4.5 minutes. The combined mixture was injected with nitrogen and whipping for an overrun of 15% and then cooled. The mixture was cooled to a temperature of approximately 45-55° F. and then packaged.

The results of Sample A produced a baked cheesecake that showed an expansion of the batter during cooking similar to a control made-from-scratch cheesecake. Sample A also resulted in a cooked cheesecake that had a continuous texture throughout and had a similar appearance and cooked height to the control cheesecake.

Example 2

In Example 2, a number of different samples with varying amounts of overrun were prepared. Samples B-D generally had the following formula:

| Amount (lb) | % Weight | Item Name |
| --- | --- | --- |
| 463.9 | 64.9% | Cream Cheese |
| 100.1 | 14.0% | Sugar |
| 0.7 | 0.1% | 10x *Vanilla* Extract |
| 48.3 | 6.8% | Cream |
| 87.1 | 12.2% | Liquid Whole Eggs |
| 14.5 | 2.0% | Sugared Egg Yolks |
| 0.4 | 0.1% | Sorbic Acid |
| 715 | 100% | |

Each of Samples B-D was prepared by transferring heated cream cheese at 160-165° F. to a Pfaudler cooking kettle. Hot cream at a temperature of 160-165° F. along with sugar were added to the kettle and agitated with recirculation. Eggs, vanilla extract and sorbic acid were then added and mixed. The mixed ingredients were steam injected to 155° F. and held for 4.5 minutes. The heated, mixed ingredients were transferred to a surge kettle where Samples C and D were nitrogen injected before transferring to a scraped surface heat exchanger. The batter was cooled and then filled into tubs at 50-58° F.

Sample B did not have nitrogen injection, but did have air incorporated therein which resulted in 45% overrun. Sample C had a low level of nitrogen injection which resulted in approximately 15% overrun. Sample D had a medium level of nitrogen injection which resulted in approximately 30% overrun.

Samples B-D resulted in batters having the following attributes:

| Property | Target Range |
| --- | --- |
| Moisture (%) | 50.8-52.6% |
| Fat (%) | 24% |
| Protein (%) | 6.2-6.7 |
| pH | 4.9 |
| Salt (%) | 0.6-0.9% |

Sample C was preferred over the other samples as it had a preferred texture, taste and appearance that was closest to a control made-from-scratch cheesecake. Sample C was chosen for further stability testing that will be described in further detail below. Samples B and D resulted in cheesecakes that were too aerated and not as dense as the control cheesecake.

Example 3

In Example 3, Samples E-H were prepared to test order of addition of ingredients and amount of overrun. Generally, each of Samples E-H included the following formula:

| | Samples E-H | |
| --- | --- | --- |
| Description | % of Total Formula | Pounds/Batch |
| Cream Cheese (F201A13) | 64.88% | 97.32 |
| Sugar | 14.00% | 21.00 |
| *Vanilla* extract | 0.09% | 0.14 |
| Heavy cream | 6.76% | 10.14 |
| Whole Eggs (Liquid, Past.) | 12.18% | 18.27 |
| Sugared Egg Yolks | 2.03% | 3.05 |
| Sorbic acid | 0.06% | 0.09 |
| Total | 100.00% | 150 |

Generally, Sample E was prepared with eggs and sugar added first to evaluate if the batter would curdle and to compare the order of addition of ingredients. As the eggs were added first prior to the hot cream and hot cream cheese, the eggs curdled and the product was not packaged or further tested.

Sample F was prepared with cream cheese, sugar and hot cream added first and with no nitrogen injection. Sample G was prepared with cream cheese, sugar and hot cream added first with nitrogen injection for a target of 10% overrun. Sample H was prepared with cream cheese, sugar and hot cream added first with nitrogen added for a target of 15% overrun.

Generally, the ingredients were added as described above to a Pfaudler kettle which utilized heating and steam injection. The ingredients were held in the Pfaudler kettle with agitation and recirculation. The ingredients were heated to 150° F. and held for 4.5 minutes. Then, steam injection was used to heat above 155° F. The samples then had nitrogen injected and were cooled and whipped to have the respective amounts of overrun.

During Example 3, the nitrogen levels were somewhat difficult to control in the pilot plant. The cheesecakes that resulted from Samples F-H resulted in heights that were approximately the same as a control made-from-scratch cheesecake. However, the textures of the sample cheesecakes varied depending on the level of nitrogen. Sample H had a denser, more creamy texture.

Example 4

In Example 4, Sample I was prepared with the following formula:

| Amount (lb) | % Weight | Item Name |
|---|---|---|
| 937 | 64.7% | Cream Cheese |
| 105 | 7.25% | Cream |
| 200 | 13.81% | Sugar |
| 1.4 | 0.1% | 10x *Vanilla* Extract |
| 174 | 12.01% | Liquid Whole Eggs |
| 30 | 2.07% | Sugared Egg Yolks |
| 0.8 | 0.06% | Sorbic acid |
| 1448 | 100% | |

Approximately 470 lb of the cream cheese was combined with 105 lb of hot cream. Next, 200 lb of sugar was added. This mixture was then agitated. Next, the remainder of the cream cheese was added and then agitated. Next, 174 lb of whole eggs, 30 lb of sugared egg yolks, 1.4 lb of vanilla extract and 0.8 lb of sorbic acid were added. This mixture was then agitated. While being agitated, steam was injected at 157° F. and held for a minimum of 108 sec so the mixture was at 155° F. The heated mixture was then sent to a surface scraped heat exchanger with a nitrogen flow of 19.5 s.c.f.h. The cooled batter was then cold filled in containers at a temperature of about 50-58° F.

Generally, the finished batter should have the following properties:

| Parameter | Target | Minimum | Maximum |
|---|---|---|---|
| Fat | 27% | 26.5% | 27.5% |
| Salt | 0.7% | 0.6% | 0.8% |
| Moisture | 50.1% | 49.0% | 51.2% |
| pH | 4.9 | 4.7 | 5.1 |
| Protein | 6% | 5.9% | 6.1% |

After baking, Sample I had a similar taste, texture and appearance as found for Sample C. Both of these samples were preferred as being closest to a control made-from-scratch cheesecake.

The stability of some of the samples was analyzed to determine the processing and ingredient differences on the batter. A control was prepared using the ingredients and methods described above for a standard New York style cheesecake made-from-scratch. This was compared with Sample C. The control was stored at 45° F. while one portion of Sample C was stored at 45° F. and another portion of Sample C was cycled between 45° F. and 55° F. where one week every thirty days the sample was held at 55° F. Portions of each of the samples were then cooked into a cheesecake eat 325° F. for one hour and twenty minutes after varying amounts of storage time. The results of the stability testing are shown below in the stability chart.

| | | | Stability Chart | | |
|---|---|---|---|---|---|
| Description | Age | Condition | Observation | Conclusion | Cheesecake height (in.) |
| Control | 1 Day | 45° F. | Cheesecake: Slightly lighter in color, slightly taller, stadium effect. Sour, *vanilla* notes, firm, sweet, dry like a New York style cheesecake, breaks down fast | Samples of cheesecakes are comparable with the control having a slightly drier texture and more sour flavor. Sample of batter is consistent and not too aerated. Continue study. | 1.5 |
| Sample C | 30 Days | 45° F. | Batter: Density in a 4 oz. cup: 111 g. Less sweet than baked cheesecake, milky, *vanilla*, smooth, slightly aerated, stable, cream cheese, not as much *vanilla* compared to the baked Control Cheesecake: darker in color, a little shorter than control, stadium effect, moist, no sour/cultured, | Time stamp on 45° F. batter 13:13. Samples of cheesecakes are comparable with the control having a slightly drier texture and more sour flavor. Sample of batter is consistent and not too aerated. Continue study. | 1.5 |

Stability Chart

| Description | Age | Condition | Observation | Conclusion | Cheesecake height (in.) |
|---|---|---|---|---|---|
| | | | lighter in texture, easier to eat, not as flavor overall, good texture throughout, faster rate of breakdown than Control, no off-notes | | |
| Control | 1 Day | 45° F. | Cheesecake: Cracked in center, light brown on edges with brown spots on cheesecake. Slightly grainy, creamy, dense, sour, sweet, typical, egg note, graham cracker flavor, buttery | Samples are comparable, continue study. Samples were all baked in the same oven due to time constraints, so appearance varied greatly. The batter sample had smoother texture, but overall mild cheesecake flavor. | 1.5 |
| Sample C | 60 Days | 45° F. | Batter: Smooth, sweet, slight aeration, creamy, milky, mild flavor overall. Cheesecake: Brown on edges, stadium effect and almost burned on cheesecake edge, smoother than control, less dense, less sour, less sweet, milder overall, not as eggy as control, *vanilla*, firm/denser on outer edge, caramel notes on outside | Samples are comparable, continue study. Samples were all baked in the same oven due to time constraints, so appearance varied greatly. The batter sample had smoother texture, but overall mild cheesecake flavor. | 1.625 |
| Sample C | 60 Days | Cycled - 45° F./55° F. | Batter: Similar to 45 F. sample, but more sweetness and more vanilla notes. Texture is little softer and slightly more aerated. Cheesecake: Stadium effect, brown on edges, cracked similar to 45 F. sample, sweeter than 45 F. sample, more *vanilla*, smooth, creamy, caramelized notes on top, graham flavor | Time stamp on 45° F. batter 13:10, Time stamp on Cycled batter 13:13. All the cheesecakes cracked and were baked in the same oven on 06/13/11, so the prototypes showed more of a stadium effect and browning on edges. Cycled sample turned onto plate showed yellow syneresis on bottom. Samples were comparable when baked and compared to control in flavor, continue study. | 1.625 |
| Control | 1 Day | 45° F. | Cheesecake: Pale in appearance with a few brown spots, no cracks, Stadium effect (slight). dense, powdery, sour cream flavor, sweetness, not very much cream cheese, tart, sour bite | Samples are comparable, continue study. All cheesecakes were baked individually in the same oven. No cracks on Control, but cracks in Batter. Prototype was less dense than Control cheesecake. | 1.5625 |
| Sample C | 90 Days | 45° F. | Batter: Sweet, *vanilla*, slightly aerated, fast rate of breakdown, cream cheese, sour, no off-notes. Cheesecake: Crack in cheesecake, most brown of all, stadium effect most pronounced, dark spots, less dense, not as cohesive in mouth, not sour, no tartness, sweet, clean, cream cheese, caramelized, top of a flan flavor | Samples are comparable, continue study. All cheesecakes were baked individually in the same oven. No cracks on Control, but cracks in Batter. Prototype was less dense than Control cheesecake. | 1.75 |
| Sample C | 90 Days | Cycled - 45° F./55° F. | Batter: Not as much sweet, not as much *vanilla* as 45° F. sample, softer than 45° F. sample, less whipped, more dense, lower flavor, more sour. Cheesecake: No cracks, brown on edges, smooth, browning even. More | Time stamp on 45° F. batter 13:07, Time stamp on Cycled batter 13:10. The prototypes showed more of a stadium effect and browning on edges. Both batter samples turned onto plate showed yellow syneresis on bottom. Samples were comparable | 1.6875 |

Stability Chart (continued)

| Description | Age | Condition | Observation | Conclusion | Cheesecake height (in.) |
|---|---|---|---|---|---|
| | | | dense than 45° F. sample, caramelized, *vanilla* on top, more sour than 45° F. sample, slight skin on top, slower rate of breakdown in mouth than 45° F. sample, but fast rate of breakdown compared to Control | when baked and compared to control in flavor, continue study. | |

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method for preparing a ready-to-bake batter, the method comprising the steps of:
    combining cream cheese, cream, sweetener, and eggs to form a mixture;
    heating the mixture to a temperature in a range of about 140° F. to about 155° F. to create a heated mixture;
    injecting an inert gas into the heated mixture when the heated mixture has a temperature in a range of about 140° F. to about 155° F.; aerating and cooling the heated mixture concurrently to form a batter.

2. The method of claim 1 wherein the aerating and cooling steps are performed in a scraped surface heat exchanger.

3. The method of claim 1 wherein the cream cheese and cream are each preheated prior to combining with the eggs.

4. The method of claim 1 further comprising the step of cool filling the batter in one or more containers to a temperature below 60° F. prior to storage.

5. The method of claim 1 wherein the sweetener is sugar.

6. The method of claim 1 wherein the batter is stable for over 120 days when stored at a temperature at or below about 55° F.

7. The method of claim 1 wherein the inert gas is nitrogen.

8. A method for preparing a ready-to-bake batter, the method comprising the steps of:
    combining cream cheese, cream, sweetener, and eggs to form a mixture;
    heating the mixture to a temperature in a range of about 140° F. to about 155° F. to create a heated mixture; and
    aerating and cooling the heated mixture concurrently to form a batter,
    wherein the temperature of the heated mixture at the beginning of the aerating and cooling step is in a range of about 140° F. to about 155° F.

9. The method of claim 8 wherein the aerating and cooling step is performed in a scraped surface heat exchanger.

10. The method of claim 8 wherein the cream cheese and cream are each preheated prior to combining with the eggs.

11. The method of claim 8 further comprising the step of cool filling the batter in one or more containers to a temperature below 60° F. prior to storage.

12. The method of claim 8 wherein the batter is stable for over 120 days when stored at a temperature at or below about 55° F.

13. The method of claim 8 further comprising the step of injecting and inert gas into the heated mixture when the temperature of the heated mixture is at least 140° F.

14. A method for preparing a ready-to-bake batter, the method comprising the steps of:
    combining cream cheese, cream, sweetener, and eggs to form a mixture;
    heating the mixture to a temperature in a range of about 140° F. to about 155° F. to create a heated mixture; and
    aerating and cooling the heated mixture in a scraped surface heat exchanger to form a batter, wherein the aerating and cooling steps are performed concurrently; and
    wherein the heated mixture is maintained above 140° F. for less than 20 minutes to minimize cooking of the eggs and the temperature of the heated mixture at the beginning of the aerating and cooling step is in a range of about 140° F. to about 155° F.

15. The method of claim 14 wherein the cream cheese and cream are each preheated prior to combining with the eggs.

16. The method of claim 14 further comprising the step of cool filling the batter in one or more containers to a temperature below 60° F. prior to storage.

17. The method of claim 14 wherein the batter is stable for over 120 days when stored at a temperature at or below about 55° F.

18. The method of claim 14 further comprising the step of injecting and inert gas into the heated mixture when the temperature of the heated mixture is at least 140° F.

19. The method of claim 1 wherein the eggs are whole, liquid eggs.

20. The method of claim 8 wherein the eggs are whole, liquid eggs.

21. The method of claim 14 wherein the eggs are whole, liquid eggs.

22. A method for preparing a ready-to-bake batter, the method comprising the steps of: combining cream cheese, cream, sweetener, and eggs to form a mixture; heating the mixture to a temperature in a range of about 140° F. to about 155° F. to create a heated mixture; injecting an inert gas into the heated mixture when the heated mixture has a temperature in a range of about 140° F. to about 155° F.; aerating the heated mixture; and cooling the heated mixture to form a batter; and wherein the mixture includes at least about 10% eggs.

* * * * *